United States Patent
Kim et al.

(10) Patent No.: US 12,013,315 B2
(45) Date of Patent: Jun. 18, 2024

(54) DEVICE FOR EVALUATING TORSIONAL STRUCTURAL PERFORMANCE OF GIRDER

(71) Applicants: KONGJU NATIONAL UNIVERSITY INDUSTRY—UNIVERSITY COOPERATION FOUNDATION, Chungcheongnam-do (KR); RESEARCH BUSINESS FOUNDATION SUNGKYUNKWAN UNIVERSITY, Gyeonggi-do (KR)

(72) Inventors: Kil-hee Kim, Chungcheongnam-do (KR); Hyeong-gook Kim, Chungcheongnam-do (KR); Yong-jun Lee, Chungcheongnam-do (KR); Min-jun Kim, Chungcheongnam-do (KR); Dong-hwan Kim, Daejeon (KR); Min-ha Kim, Chungcheongnam-do (KR); Jung-yoon Lee, Gyeonggi-do (KR); Sang-woo Kim, Gyeonggi-do (KR)

(73) Assignees: KONGJU NATIONAL UNIVERSITY INDUSTRY-UNIVERSITY COOPERATION FOUNDATION, Chungcheongnam-do (KR); RESEARCH BUSINESS FOUNDATION SUNGKYUNKWAN UNIVERSITY, Gyeonggi-do (KR)

( * ) Notice: Subject to any disclaimer, the term of this patent is extended or adjusted under 35 U.S.C. 154(b) by 291 days.

(21) Appl. No.: 17/623,208

(22) PCT Filed: Jun. 25, 2019

(86) PCT No.: PCT/KR2019/007643
§ 371 (c)(1),
(2) Date: Dec. 27, 2021

(87) PCT Pub. No.: WO2020/262723
PCT Pub. Date: Dec. 30, 2020

(65) Prior Publication Data
US 2022/0364950 A1 Nov. 17, 2022

(51) Int. Cl.
*G01M 5/00* (2006.01)
*G01N 3/26* (2006.01)

(52) U.S. Cl.
CPC ........ *G01M 5/0025* (2013.01); *G01M 5/0041* (2013.01); *G01M 5/005* (2013.01); *G01M 5/0058* (2013.01); *G01N 3/26* (2013.01)

(58) Field of Classification Search
CPC .. G01M 5/0025; G01M 5/0041; G01M 5/005; G01M 5/0058; G01N 3/22; G01N 3/26
See application file for complete search history.

(56) References Cited

FOREIGN PATENT DOCUMENTS

| CN | 206362510 U | * | 7/2017 |
|---|---|---|---|
| JP | 2015-108585 A | | 6/2015 |

(Continued)

OTHER PUBLICATIONS

International Search Report for PCT/KR2019/007643 dated Mar. 24, 2020.

*Primary Examiner* — Paul M. West
(74) *Attorney, Agent, or Firm* — The PL Law Group, PLLC

(57) ABSTRACT

In a device for evaluating torsional structural performance of girder according to an embodiment of the present disclosure, a guide unit of a support member formed in a shape of an arc having its center that matches a shear center of the girder rotatably supports a rotating member, so that the shear center of the girder matches a center of torsion during clockwise or counterclockwise rotation of the rotating member, thereby measuring an accurate angle of twist and preventing an incident in which the rotating member escapes due to separation of a component by a rotational force.

6 Claims, 8 Drawing Sheets

(56) References Cited

FOREIGN PATENT DOCUMENTS

| KR | 10-0454561 B1 | 11/2004 |
|----|---------------|---------|
| KR | 10-0929439 B1 | 12/2009 |
| KR | 10-0930805 B1 | 12/2009 |
| KR | 10-2010-0127546 A | 12/2010 |

* cited by examiner

Center of torsion (a)

Center of torsion    C (Shear center)

(b)

DEVICE FOR EVALUATING TORSIONAL STRUCTURAL PERFORMANCE OF GIRDER

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2019/007643, filed Jun. 25, 2019, the entire contents of which are incorporated herein by reference.

BACKGROUND

1. Technical Field

The present disclosure relates to a device for evaluating torsional structural performance of girder, and more particularly, to a device for evaluating torsional structural performance of girder which twists the girder to induce a torsional moment in order to test the fracture properties of the girder.

2. Background Art

In general, a girder installed at a right angle to a beam is usually used in the field of construction or civil engineering.

After manufactured, the girder is forcibly twisted to test the torsional strength through the girder.

That is, the manufactured girder is forcibly twisted by a device for evaluating torsional structural performance, and an angle of twist that is proportional to a torsional moment applied using an axis perpendicular to a cross section as a rotation axis is measured.

For example, Korean Patent No. 10-0930805 (published on Dec. 9, 2009) discloses a girder testing twist machine.

The device for evaluating torsional structural performance of girder by twisting the girder forcibly rotates two ends of the girder in different directions to induce a torsional moment.

That is, the device for evaluating torsional structural performance of girder twists the girder by rotating one end of the girder in the counterclockwise direction and the other end of the girder in the clockwise direction.

In this instance, the device for evaluating torsional structural performance of girder twists the girder through a rotating member which rotates the two ends of the girder.

However, the common device for evaluating torsional structural performance of girder as described above has a safety problem with the escape of the rotating member rotatably supported on a bearing member by the rotational force.

In addition, the common device for evaluating torsional structural performance of girder fails to measure an accurate angle of twist since during the clockwise or counterclockwise rotation of the pair of rotating members rotatably supported on the bearing member as shown in (A) of FIG. 1, the shear center C of the girder moves and does not match the center of torsion as shown in (B) of FIG. 1.

SUMMARY

The present disclosure is directed to providing a device for evaluating torsional structural performance of girder in which a guide unit of a support member formed in the shape of an arc having its center that matches the shear center C of the girder G rotatably supports a rotating member, so that the shear center C of the girder matches the center of torsion during the clockwise or counterclockwise rotation of the rotating member, thereby measuring an accurate angle of twist, and preventing an incident in which the rotating member escapes due to the separation of a component by the rotational force.

To solve the above-described technical problem, a device for evaluating torsional structural performance of girder according to the present disclosure includes a rotating member to twist the girder G while rotating such that a center of rotation matches a shear center C of the girder G by a pressing force applied from above, a press member to press down on one or the other upper side of the rotating member, and a support member to rotatably support the rotating member pressed by the press member.

Additionally, the rotating member of the present disclosure includes a sliding unit at a lower part, and the sliding unit is formed in a shape of an arc having its center that matches the shear center C of the girder G.

Additionally, the support member of the present disclosure includes a guide unit at an upper part, and the guide unit is formed in an arc shape conforming to that of the sliding unit to slidably support the sliding unit in a direction of rotation.

Additionally, the support member of the present disclosure includes a friction buffer member formed on an upper surface of the guide unit along a circumferential direction to support the sliding unit.

Additionally, the support member of the present disclosure includes grooves formed on the upper surface of the guide unit along the circumferential direction, and a plurality of roll members which rotates with parts being insert into the grooves to support the sliding unit.

Additionally, the plurality of grooves of the present disclosure are formed on the upper surface of the guide unit along the circumferential direction at a predetermined interval in a lengthwise direction of the girder G.

Additionally, the grooves of the present disclosure are formed such that two facing sides get closer to each other as they go upward to prevent the roll members from escaping.

Additionally, the support member of the present disclosure includes an anti-escape member coupled to two ends of the guide unit to close two sides of the grooves of the circumferential direction in order to prevent the roll members from escaping in a lateral direction.

Additionally, the support member of the present disclosure includes a guide unit to rotatably support the rotating member, an edge plate to support the guide unit and form a lower surface and two side surfaces, and a stiffener formed in a grid shape within the edge plate to reinforce stiffness of the edge plate and support the guide unit.

According to the present disclosure, the guide unit of the support member formed in the shape of an arc having its center that matches the shear center C of the girder G rotatably supports the rotating member, so that the shear center C of the girder matches the center of torsion during the clockwise or counterclockwise rotation of the rotating member, thereby measuring an accurate angle of twist, and preventing an incident in which the rotating member escapes due to the separation of a component by the rotational force.

In addition, the press member is installed on each of two upper sides of the rotating member and presses down on the rotating member to allow the rotating member to repeatedly rotate in the clockwise direction and the counterclockwise direction, thereby simply performing a fatigue test of the girder G without any additional component.

DETAILED DESCRIPTION

Hereinafter, some embodiments of the present disclosure are described in detail through exemplary drawings. In adding the reference signs to the elements in each drawing, it should be noted that like elements have like reference signs as possible although they are shown in different drawings. Additionally, in describing the present disclosure, when it is determined that a certain detailed description of relevant known elements or functions may obscure the subject matter of the present disclosure, its detailed description is omitted.

Additionally, in describing the elements of the present disclosure, the terms first, second, A, B, (a), (b) may be used. These terms are used to distinguish an element from another, and the essence or sequence or order of the corresponding elements is not limited by the terms. When an element is referred to as being "connected", "coupled" or "linked" to the other element, the element may be directly connected or coupled to the other element, but it should be understood that another element may be "connected", "coupled" or "linked" between each element.

Figure 1:
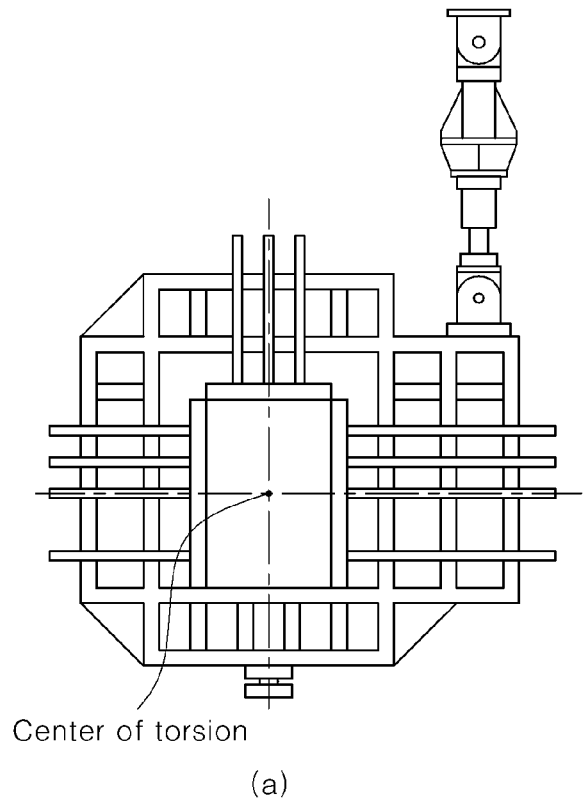
FIG. 1 is a front view showing a device for evaluating torsional structural performance of girder according to the related art.
Figure 1:
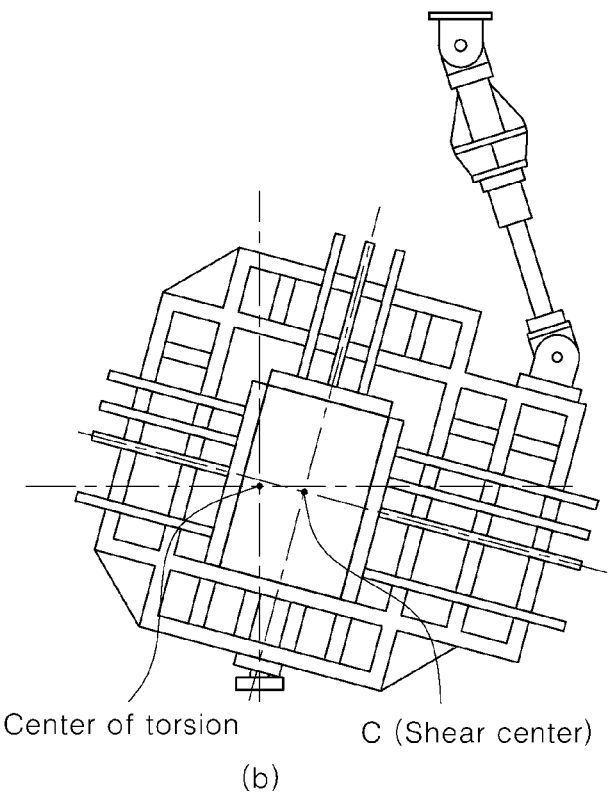
Figure 2:
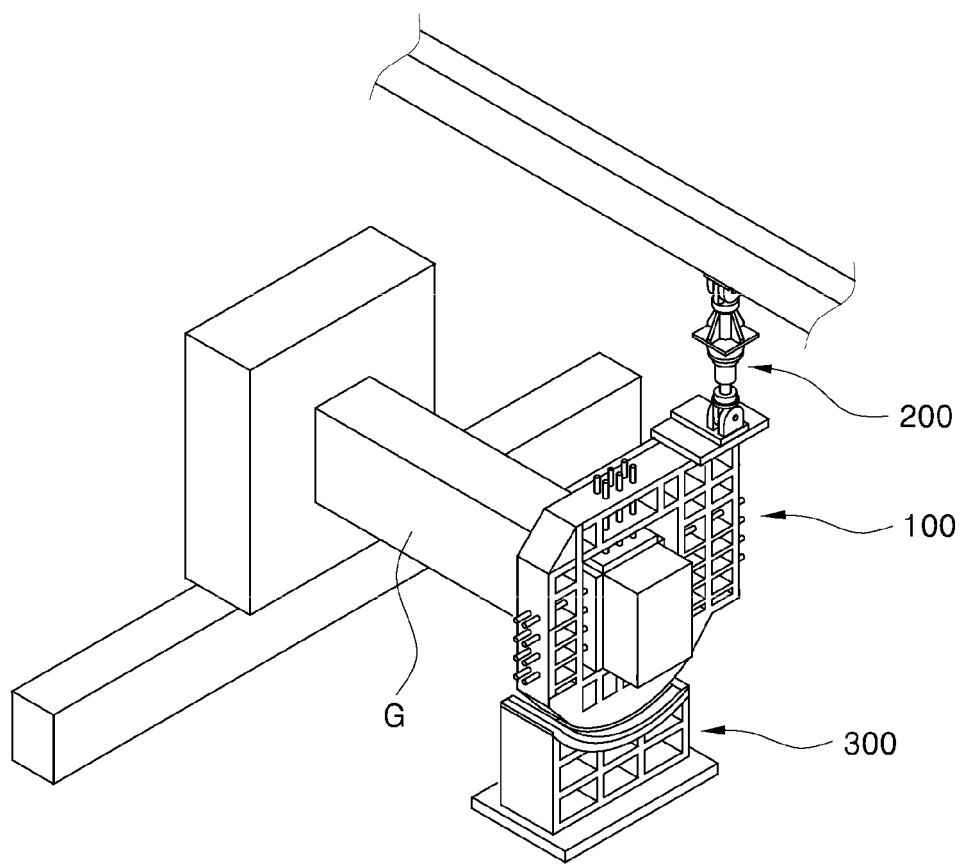
FIG. 2 is a perspective view showing a device for evaluating torsional structural performance of girder according to an embodiment of the present disclosure.
Figure 3:
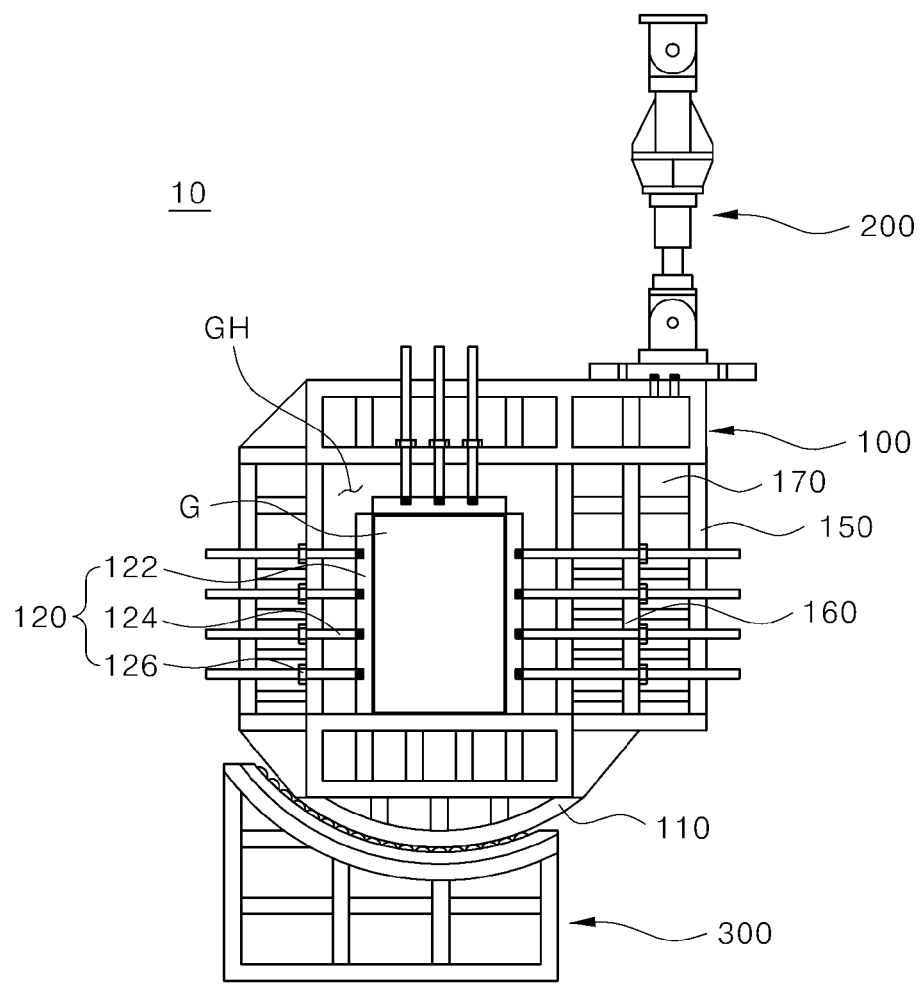
FIG. 3 is a front view showing a device for evaluating torsional structural performance of girder according to an embodiment of the present disclosure.
Figure 4:
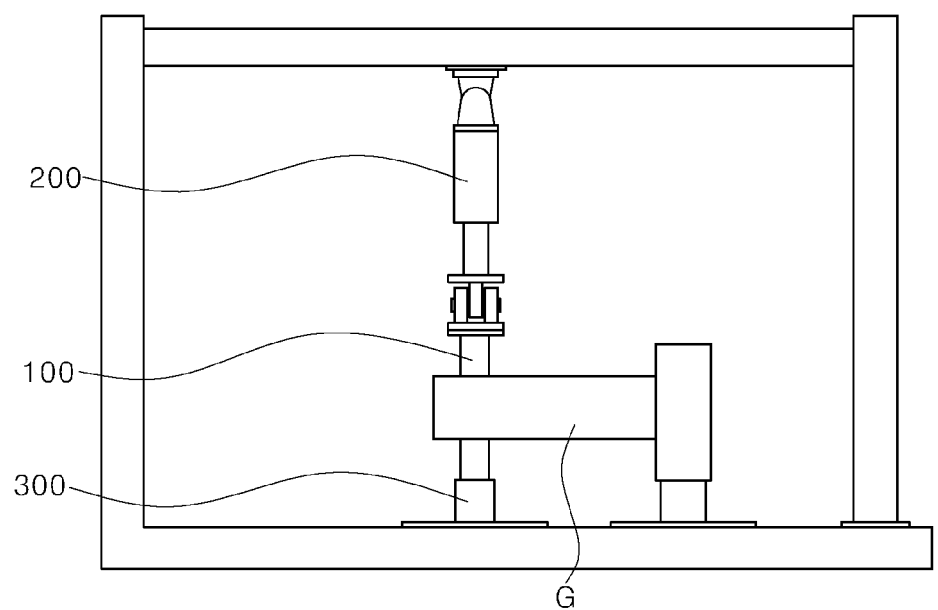
FIG. 4 is a side view showing a device for evaluating torsional structural performance of girder according to an embodiment of the present disclosure.
Figure 5:
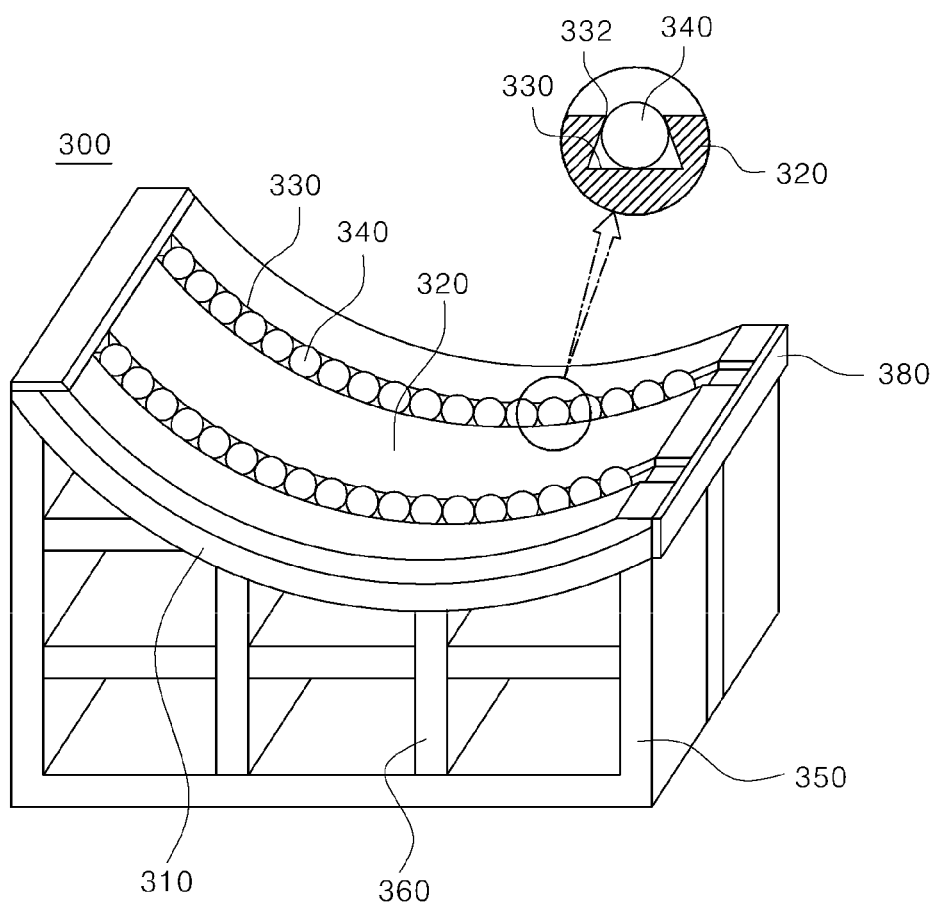
FIG. 5 is a perspective view showing a support member of a device for evaluating torsional structural performance of girder according to an embodiment of the present disclosure.
Figure 6:
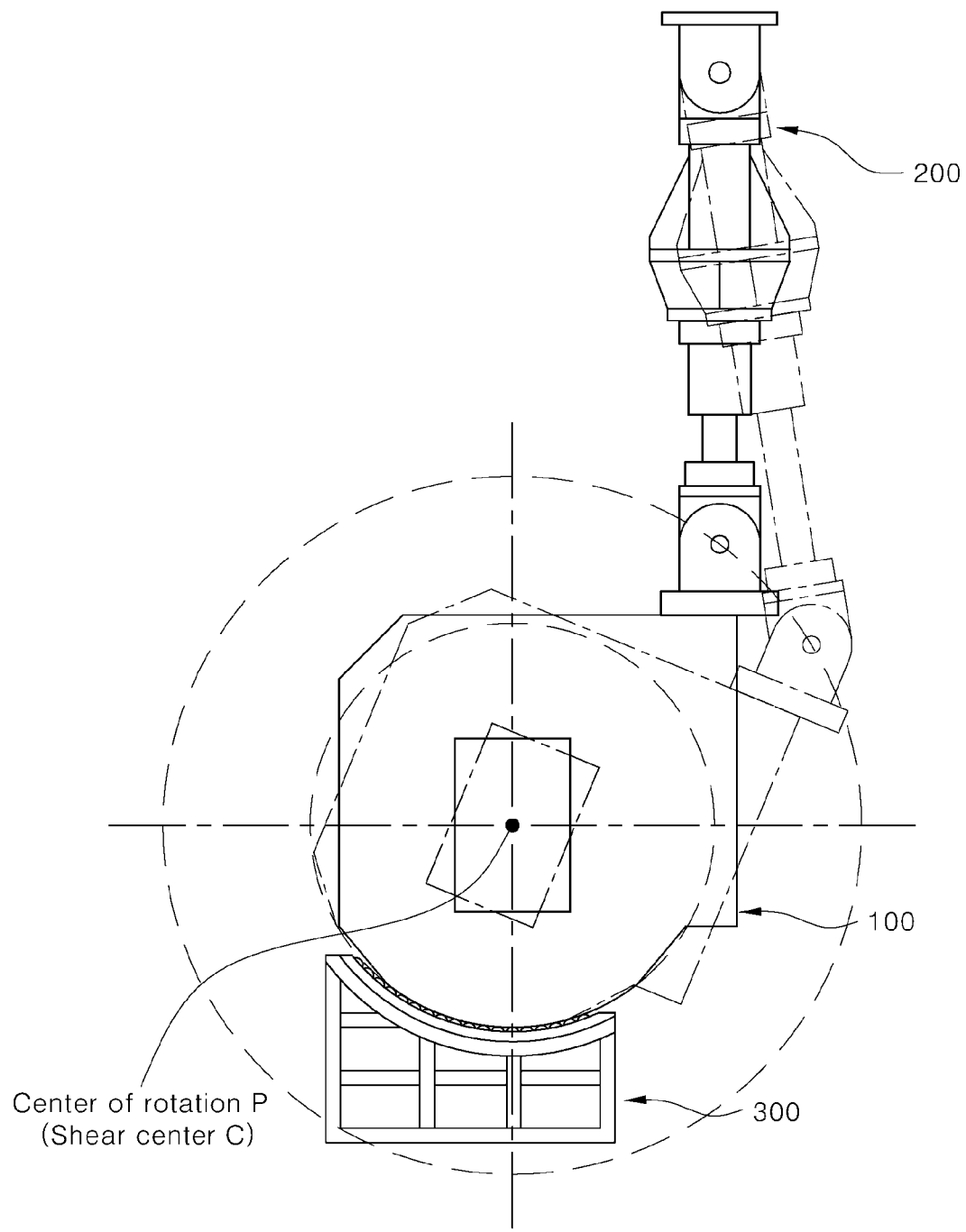
FIG. 6 is a diagram showing a device for evaluating torsional structural performance of girder according to an embodiment of the present disclosure while in use.

FIG. 2 is a perspective view showing a device for evaluating torsional structural performance of girder according to an embodiment of the present disclosure, FIG. 3 is a front view showing the device for evaluating torsional structural performance of girder according to an embodiment of the present disclosure, FIG. 4 is a side view showing the device for evaluating torsional structural performance of girder according to an embodiment of the present disclosure, FIG. 5 is a perspective view showing a support member of the device for evaluating torsional structural performance of girder according to an embodiment of the present disclosure, and FIG. 6 is a diagram showing the device for evaluating torsional structural performance of girder according to an embodiment of the present disclosure while in use.

As shown in these drawings, the device 10 for evaluating torsional structural performance of girder according to an embodiment of the present disclosure includes a rotating member 100 to twist the girder G while rotating such that the center of rotation matches the shear center C of the girder G by a pressing force applied from the above; a press member 200 to press down on one or the other upper side of the rotating member 100; and a support member 300 to rotatably support the rotating member 100 pressed by the press member 200.

As shown in FIGS. 2 to 5, the device 10 for evaluating torsional structural performance of girder includes the rotating member 100, the press member 200 and the support member 300.

While the press member 200 presses down on one or the other upper side of the rotating member 100, the rotating member 100 rotates one end of the girder in the clockwise direction or counterclockwise direction to twist it, and includes an edge plate 150, a stiffener 160 and a web 170.

That is, the rotating member 100 includes the edge plate 150 of a rectangular shape to withstand a required load (a torsion force) necessary for rotation of the girder G, and the stiffener 160 and the web 170 are integrally formed or attached within the edge plate 150 by welding to prevent deformation of the edge plate 150.

In this instance, the shape (thickness, width, length, height, etc.) of the edge plate 150 may be variously formed, but in the present disclosure, the edge plate 150 is formed in such a shape that the girder G passes therethrough so that the center of rotation matches the shear center C of the girder G to measure an accurate angle of twist.

Accordingly, one side of the girder G passes through the edge plate 150 and is fixed to the rotating member 100 by a fastener 120 described below.

The stiffener 160 has a grid shape and is fixed to the inner surface of the edge plate 150 by welding to form a girder hole GH through which the girder G passes.

When the edge plate 150 twists the girder G while rotating, the stiffener 160 supports the edge plate 150 firmly to prevent deformation of the edge plate 150.

The web 170 has a flat plate shape and is fixed to the inner surface of the edge plate 150 by welding perpendicular to the stiffener 160 to allow the girder G to pass through.

When the edge plate 150 twists the girder G while rotating, the web 170 supports the edge plate 150 and the stiffener 160 firmly to prevent deformation of the edge plate 150.

In the present disclosure, the rotating member 100 includes a sliding unit 110 at the lower part, and the sliding unit 110 is formed in the shape of an arc having its center that matches the shear center C of the girder G.

The sliding unit 110 is formed in the shape of an arc having its center that matches the shear center C of the girder G, and is formed on the lower surface of the edge plate 150 in a downward convex shape to have its center that matches the shear center C of the girder G, and is supported on a downward concave guide unit 310 of the support member 300.

Accordingly, as shown in FIG. 6, when the press member 200 presses down on one upper side of the rotating member 100, the rotating member 100 rotates around the shear center C of the girder G as the center of rotation P in the clockwise direction or counterclockwise direction with the downward convex arc shaped sliding unit 110 being slidably supported on the downward concave arc shaped guide unit 310 of the support member 300.

Meanwhile, the above-described fastener 120 includes a contact plate 122, a press bolt 124 and a nut 126.

The contact plate 122 is mounted on the end of the press bolt 124, and comes into close contact with the outer surface of the girder G by a pressing force of the press bolt 124.

The press bolt 124 is fastened to the nut 126 perpendicular to the outer surface of the girder G to press the contact plate 122 by the fastening strength with the nut 126.

The nut 126 is fixed to the edge plate 150 or the stiffener 160 toward the outer surface of the girder G.

In this instance, a plurality of the contact plates 122 comes into close contact with the outer surface of the girder G, and a plurality of press bolts 124 and a plurality of nuts 126 are equipped in the edge plate 150 or the stiffener 160 at a predetermined interval to press the contact plate 122.

When the fastener 120 brings the press bolt 124 fastened to the nut 126 into rotation, the contact plate 122 is moved by the press bolt 124 and comes into close contact with the outer surface of the girder, and when the press bolt 124 fastened to the nut 126 is continuously rotated, the girder G is supported on the contact plate 122 by the pressing force of the press bolt 124, and in this state, is fixed to the rotating member 100.

The press member 200 is installed on one or two upper sides of the rotating member 100 to press down on one or the other upper side of the rotating member 100.

In an embodiment of the present disclosure, the press member 200 is installed on one upper side of the rotating member 100 to press down on one upper side of the rotating member 100 to allow the rotating member 100 to rotate in the clockwise direction or counterclockwise direction.

In this instance, the press member 200 may be installed on two upper sides of the rotating member 100 to press down on one or the other upper side of the rotating member 100 to allow the rotating member 100 to rotate in the clockwise direction or counterclockwise direction.

Here, the press member 200 may be a hydraulic cylinder installed vertically on one or two upper sides of the rotating member 100, and selectively presses the rotating member 100 by contraction and extension.

The support member 300 rotatably supports the rotating member 100 pressed by the press member 200, and includes a guide unit 310, an edge plate 350 and a stiffener 360.

The guide unit 310 rotatably supports the rotating member 100, the edge plate 350 is formed such that its side coupled to two sides of the bottom surface supports the guide unit 310 to support loads applied to the guide unit 310, and the stiffener 360 is formed in a grid shape within the edge plate 350 to reinforce the stiffness of the edge plate 350 and support the guide unit 310.

The guide unit 310 is formed on the upper side of the edge plate 350 in a downward concave shape to have its center that matches the shear center C of the girder G, and rotatably supports the rotating member 100.

That is, the guide unit 310 is formed in the shape of an arc having its center that matches the shear center C of the girder G, and is formed on the upper side of the edge plate 350 in a downward concave shape to have its center that matches the shear center C of the girder G.

As described above, when the press member 200 presses down on one upper side of the rotating member 100, the rotating member 100 rotates around the shear center C of the girder G as the center of rotation P in the clockwise direction or counterclockwise direction with the downward convex arc shaped sliding unit 110 being slidably supported on the downward concave arc shaped guide unit 310 of the support member 300.

Subsequently, the support member 300 includes a friction buffer member 320 formed on the upper surface of the guide unit 310 along the circumferential direction to support the sliding unit 110.

The friction buffer member 320 is formed on the upper surface of the guide unit 310 along the circumferential direction to rotatably support the sliding unit 110.

As the friction buffer member 320 comes into close contact with the sliding unit 110 of the rotating member 100, sliding resistance occurs, and thus the friction buffer member 320 is formed from a material which has not only abrasion resistance and low friction but also is less elastic by heat.

The friction buffer member 320 is interposed between the sliding unit 110 of the rotating member 100 and the guide unit 310 to support the load of the rotating member 100 and reduce the sliding resistance between the rotating member 100 and the support member 300.

Accordingly, the friction buffer member 320 may be formed from an engineering plastic based material such as polyacetal (POM), polyamide (PA), polycarbonate (PC), polyimide (PI) and polybutylene terephthalate (PBT), or synthetic resin such as natural rubber or polyester elastomer (PE).

In addition, the support member 300 includes grooves 330 formed on the upper surface of the guide unit 310 along the circumferential direction; and a plurality of roll members 340 which rotates with parts being inserted into the grooves 330 to support the sliding unit 110.

The plurality of grooves 330 is formed on the upper surface of the guide unit 310 or the friction buffer member 320 along the circumferential direction at a predetermined interval in the lengthwise direction of the girder G, and rotatably supports the roll member 340.

In this instance, the groove 330 has a protrusion 332 on two sides in the lengthwise direction of the girder G to support the roll member 340 in order to prevent the roll member 340 from escaping.

That is, as shown in FIG. 5, the groove 330 is formed such that the two facing sides get closer to each other as it goes upward to prevent the roll member 340 from escaping, and on the open top, the protrusion 332 protrudes inward to support the roll member 340.

In addition, the support member 300 includes an anti-escape member 380 coupled to two ends of the guide unit 310 or the friction buffer member 320 to close the two sides of the groove 330 of the circumferential direction in order to prevent the roll member 340 from escaping in the lateral direction.

The anti-escape member 380 is coupled to the two ends of the guide unit 310 or the friction buffer member 320 to close the two sides of the groove 330 of the circumferential direction and prevent the roll member 340 from escaping in the lateral direction.

Accordingly, the roll member 340 rotates without escaping from the groove 330 by the protrusion 332 and the anti-escape member 380.

The roll member 340 rotates with its parts being inserted into the groove 330 to rotatably support the sliding unit 110, and changes sliding friction to rotational friction to reduce the motional resistance.

In this instance, the groove 330 may be coated with a lubricant such as a grease to allow the roll member 340 to smoothly rotate.

The roll member 340 is formed, for example, in the shape of a ball or a roller to reduce the contact area, and supports the load of the rotating member 100 and reduces the frictional resistance between the rotating member 100 and the support member 300.

As described above, the device 10 for evaluating torsional structural performance of girder can reduce the frictional resistance since when the rotating member 100 rotates, the roll member 340 rotates in contact with the sliding unit 110 of the rotating member 100 with part of the roll member 340 being inserted into the groove 330.

Additionally, as the guide unit 310 of the support member 300 formed in the shape of an arc having its center that matches the shear center C of the girder G rotatably supports the rotating member 100, the shear center C of the girder G matches the center of torsion during the clockwise direction or counterclockwise direction of the rotating member 100, thereby measuring an accurate angle of twist and preventing an incident in which the rotating member 100 escapes due to the separation of a component by the rotational force.

Figure 7:
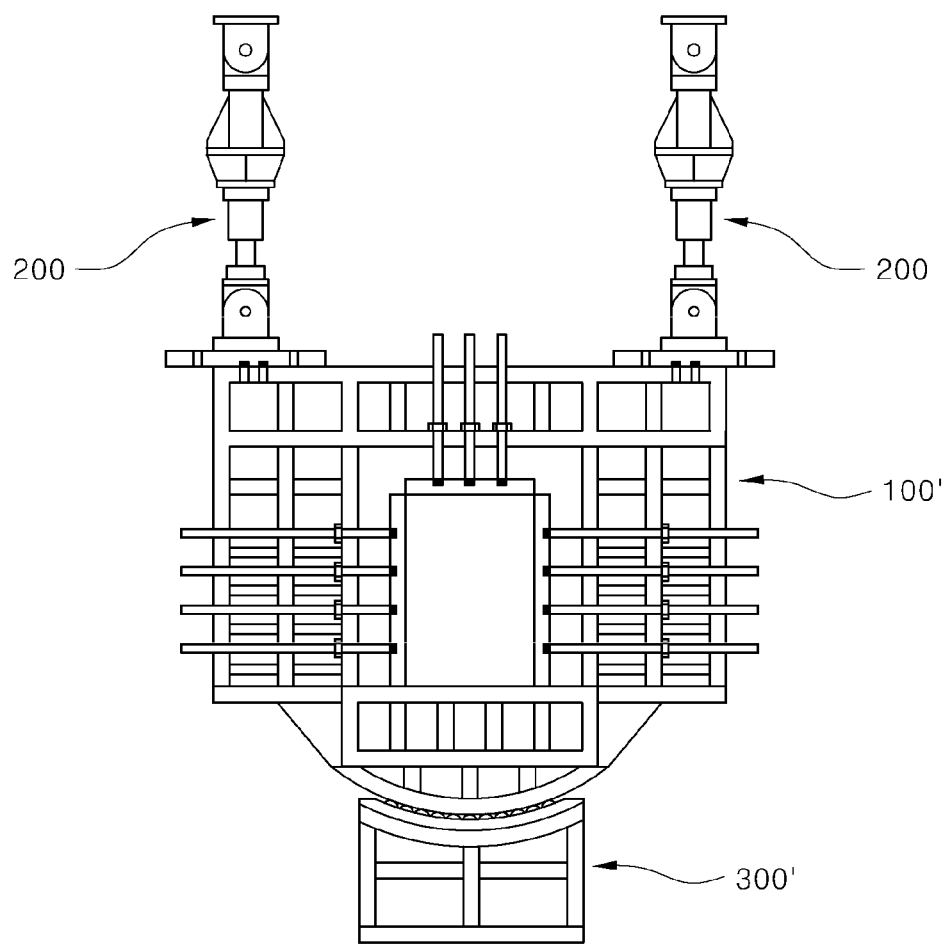
FIG. 7 is a front view showing a device for evaluating torsional structural performance of girder according to another embodiment of the present disclosure.
Figure 8:
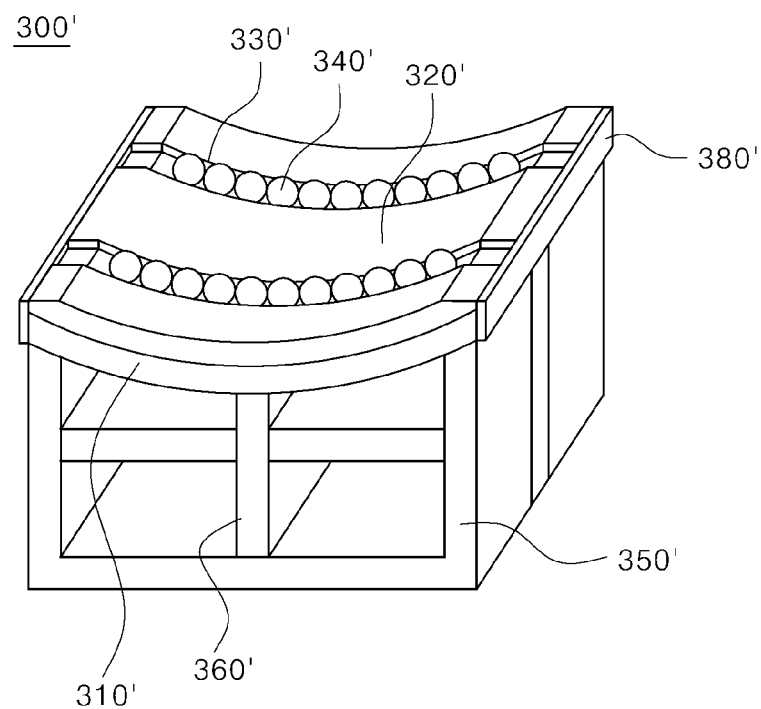
FIG. 8 is a perspective view showing a support member of a device for evaluating torsional structural performance of girder according to another embodiment of the present disclosure.

FIG. 7 is a front view showing a device for evaluating torsional structural performance of girder according to another embodiment of the present disclosure, and FIG. 8 is a perspective view showing a support member of the device for evaluating torsional structural performance of girder according to another embodiment of the present disclosure.

In another embodiment of the present disclosure, the device 10 for evaluating torsional structural performance of girder may include the press member 200 installed on two upper sides of the rotating member 100 to allow the rotating member 100 to repeatedly rotate in the clockwise direction and counterclockwise direction.

More specifically, as shown in FIG. 8, the rotating member 100' and the support member 300' are formed in a symmetrical shape on the left and right sides, and the press member 200' is installed on each of the one upper side and the other upper side of the rotating member 100'.

Accordingly, when the press member 200' presses down on one upper side of the rotating member 100', the downward convex arc shaped sliding unit 110' rotates around the shear center C of the girder G as the center of rotation P in the clockwise direction while being slidably supported on the downward concave arc shaped guide unit 310' of the support member 300', and when the press member 200' presses down on the other upper side of the rotating member 100', the downward convex arc shaped sliding unit 110' rotates around the shear center C of the girder G as the center of rotation P in the counterclockwise direction while being slidably supported on the downward concave arc shaped guide unit 310' of the support member 300'.

The press member 200' is installed on each of two upper sides of the rotating member 100' and presses down on the rotating member 100' to allow the rotating member 100' to repeatedly rotate in the clockwise direction and counterclockwise direction, thereby simply performing a fatigue test of the girder G without an additional component.

Additionally, the device for evaluating torsional structural performance of girder according to the present disclosure may be provided at each of the two ends of the girder to twist the girder by rotating one end of the girder in the counterclockwise direction and the other end of the girder in the clockwise direction.

Here, the support member 300' may be formed in a symmetrical shape on the left and right sides, and the support member 300' may extend along the circumferential direction to the side opposite the side on which the press member 200' is installed and surround the rotating member 100' to disperse the pressing force of the press member 200'.

While the preferred embodiments of the present disclosure have been hereinabove illustrated and described, the present disclosure is not limited to the above-described specific preferred embodiments, and it is obvious to those skilled in the art that a variety of modifications may be made thereto without departing from the subject matter of the present disclosure set forth in the appended claims, and such modifications fall within the scope of the appended claims.

What is claimed is:

1. A device for evaluating torsional structural performance of girder by inducing a torsional moment, comprising:
    a rotating member to twist the girder while rotating such that a center of rotation matches a shear center of the girder by a pressing force applied from above;
    a press member to press down on one or the other upper side of the rotating member; and
    a support member to rotatably support the rotating member pressed by the press member,
    wherein the rotating member includes a sliding unit at a lower part, and the sliding unit is formed in a shape of an arc having its center that matches the shear center of the girder,
    wherein the support member includes a guide unit at an upper part, and the guide unit is formed in an arc shape conforming to that of the sliding unit to slidably support the sliding unit in a direction of rotation,
    wherein the support member includes:
        grooves formed on the upper surface of the guide unit along the circumferential direction; and
        a plurality of roll members which rotates with parts being insert into the grooves to support the sliding unit,
    wherein the grooves are formed such that two facing sides get closer to each other as they go upward to prevent the roll members from escaping.

2. The device for evaluating torsional structural performance of girder according to claim 1, wherein the support member includes a friction buffer member formed on an upper surface of the guide unit along a circumferential direction to support the sliding unit.

3. The device for evaluating torsional structural performance of girder according to claim 1, wherein the plurality of grooves are formed on the upper surface of the guide unit along the circumferential direction at a predetermined interval in a lengthwise direction of the girder.

4. A device for evaluating torsional structural performance of girder by inducing a torsional moment, the device comprising:
    a rotating member to twist the girder while rotating such that a center of rotation matches a shear center of the girder by a pressing force applied from above;
    a press member to press down on one or the other upper side of the rotating member; and
    a support member to rotatably support the rotating member pressed by the press member,
    wherein the rotating member includes a sliding unit at a lower part, and the sliding unit is formed in a shape of an arc having its center that matches the shear center of the girder,
    wherein the support member includes a guide unit at an upper part, and the guide unit is formed in an arc shape conforming to that of the sliding unit to slidably support the sliding unit in a direction of rotation,
    wherein the support member includes:
        grooves formed on the upper surface of the guide unit along the circumferential direction; and a plurality of roll members which rotates with parts being insert into the grooves to support the sliding unit, wherein the support member includes an anti-escape member coupled to two ends of the guide unit to close two sides of the grooves of the circumferential direction in order to prevent the roll members from escaping in a lateral direction.

5. The device for evaluating torsional structural performance of girder according to claim 4, wherein the support member includes a friction buffer member formed on an upper surface of the guide unit along a circumferential direction to support the sliding unit.

6. The device for evaluating torsional structural performance of girder according to claim 4, wherein the plurality of grooves are formed on the upper surface of the guide unit along the circumferential direction at a predetermined interval in a lengthwise direction of the girder.

* * * * *